(12) United States Patent
Fuchs et al.

(10) Patent No.: US 12,157,088 B2
(45) Date of Patent: Dec. 3, 2024

(54) SERVICE SYSTEM FOR GAS COMPARTMENTS

(71) Applicants: WIKA Alexander Wiegand SE & Co. KG, Klingenberg (DE); Westnetz GmbH, Dortmund (DE)

(72) Inventors: Daniel Fuchs, Aschaffenburg (DE); Klaus Franz, Stockstadt (DE); Dominik Huller, Grossheubach (DE); Christoph Rezun, Waltrop (DE); Thomas Saewe, Menden (DE)

(73) Assignees: Wika Alexander Wiegand SE & Co. KG, Klingenberg (DE); Westnetz GmbH, Dortmund (DE)

( * ) Notice: Subject to any disclaimer, the term of this patent is extended or adjusted under 35 U.S.C. 154(b) by 855 days.

(21) Appl. No.: 17/120,838

(22) Filed: Dec. 14, 2020

(65) Prior Publication Data

US 2021/0178322 A1 Jun. 17, 2021

(30) Foreign Application Priority Data

Dec. 13, 2019 (DE) .................. DE10 2019134269.4

(51) Int. Cl.
*B01D 53/30* (2006.01)
*B01D 53/26* (2006.01)
*H02B 1/00* (2006.01)

(52) U.S. Cl.
CPC ........... *B01D 53/30* (2013.01); *B01D 53/261* (2013.01); *B01D 53/265* (2013.01); *H02B 1/00* (2013.01)

(58) Field of Classification Search
CPC .... B01D 53/30; B01D 53/261; B01D 53/265; B01D 2256/26; H02B 1/00; H01H 33/56
See application file for complete search history.

(56) References Cited

U.S. PATENT DOCUMENTS 6,004,377 A * 12/1999 Tamata ................ B01D 53/685
                                                              95/82
6,921,428 B2   7/2005 Yamamoto et al.
6,966,934 B1 * 11/2005 Sato ........................ B01D 53/04
                                                              55/467

(Continued)

FOREIGN PATENT DOCUMENTS

CN    105565280 A    5/2016
CN    107774100 A    3/2018

(Continued)

*Primary Examiner* — Christopher P Jones
*Assistant Examiner* — Phillip Y Shao
(74) *Attorney, Agent, or Firm* — Muncy, Geissler, Olds & Lowe, P.C.

(57) ABSTRACT

A service system for gas compartments with a gas treatment device for treating a gas present in at least one gas compartment, at least one sensor device for monitoring at least one gas property of the gas, at least one connection coupled to the gas treatment device and the at least one sensor device, which connection is intended for coupling to the gas compartment, at least one conveying device for conveying a gas from the gas compartment into the gas treatment device and from the gas treatment device at least indirectly back into the gas compartment, and at least one control unit which is connected at least to the sensor device and monitors and controls at least the conveying device and/or the gas treatment device.

16 Claims, 2 Drawing Sheets

(56) References Cited

U.S. PATENT DOCUMENTS

| | | | | |
|---|---|---|---|---|
| 7,612,988 B2 * | 11/2009 | Ulinskas | ............... | H01H 71/74 |
| | | | | 361/605 |
| 9,362,071 B2 * | 6/2016 | Boucher | ............... | H01H 33/26 |
| 10,352,618 B2 | 7/2019 | Tabke et al. | | |
| 2012/0118043 A1 * | 5/2012 | Heckler | ................. | G01F 22/02 |
| | | | | 73/30.02 |
| 2013/0215548 A1 * | 8/2013 | Eastman | ............... | H01H 33/59 |
| | | | | 361/115 |
| 2018/0087839 A1 * | 3/2018 | Tabke | .................... | B01D 53/30 |
| 2018/0135804 A1 * | 5/2018 | Sieber | ..................... | H01B 3/56 |

FOREIGN PATENT DOCUMENTS

| | | |
|---|---|---|
| DE | 102013007751 A1 | 11/2014 |
| EP | 0885841 A1 | 12/1998 |
| EP | 1091182 A2 | 4/2001 |
| EP | 1360985 A1 | 11/2003 |
| EP | 3283833 B1 | 3/2019 |
| WO | WO2016165996 A1 | 10/2016 |

\* cited by examiner

SERVICE SYSTEM FOR GAS COMPARTMENTS

This nonprovisional application claims priority under 35 U.S.C. § 119(a) to German Patent Application No. 10 2019 134 26, which was filed in Germany on Dec. 13, 2019, and which is herein incorporated by reference.

BACKGROUND OF THE INVENTION

Field of the Invention

The present invention relates to a service system for gas compartments.

Description of the Background Art

Systems with gas compartments, for example electrical switchgear, are generally known from the state of the art in which a gas compartment is a container for gas-insulated electrical high-voltage equipment. Such high-voltage equipment includes, for example, electrical circuit breakers and instrument transformers.

Such electrical high-voltage equipment is filled with an insulating and quenching gas as a protective gas, for example sulfur hexafluoride, $SF_6$ for short. The protective gas is enclosed in the corresponding gas compartment at a specified minimum pressure, for example 6 bar overpressure, and causes an arc to be extinguished which is generated between electrical contacts when they are opened. Safe functioning depends in particular on the purity of the protective gas. The purity of the protective gas can be impaired in particular by the penetration of moisture or air into the protective gas volume or by the formation of decomposition products of the protective gas.

Even if the operating pressure of the gas compartment is many times the atmospheric pressure, as a rule the design of the gas compartment makes it impossible to prevent moisture in the form of water vapor from diffusing into the gas compartment. The water vapor penetrating into the gas compartment reduces the purity of the protective gas and thus its electrical properties, in particular its permittivity. In principle, however, the moisture content in the protective gas should be so low that a pressure dew point of the protective gas of −5° C. is not exceeded.

To achieve this, an arrangement is known from EP 3 283 833 B1, which corresponds to US 2018/0087839. which includes: a first and a second gas compartment filled with protective gas, a pipeline system connecting the first and second gas compartment, a compressor located in the pipeline system, a gas drying unit arranged in the pipeline system, means for detecting gas pressure within the pipeline system, valves that can be controlled such that the compressor can selectively deliver gas from the first gas compartment to the second gas compartment and gas from the second gas compartment to the first gas compartment, means for controlling the compressor as a function of the gas pressure within the pipeline system and means for controlling the valves as a function of the desired direction of gas flow.

Furthermore, a method for drying a gas compartment with a protective gas atmosphere prevailing in the gas compartment under overpressure with an operating pressure and a predetermined minimum pressure is described in the above, wherein the predetermined minimum pressure of the gas compartment is monitored and the operating pressure is greater than the minimum pressure. The method has following steps: removal of a first partial quantity of the protective gas from the gas compartment, wherein the partial quantity is equivalent to a pressure difference which is less than or equal to a difference between the operating pressure and the minimum pressure, introduction of a second partial quantity of a dry or dried protective gas into the gas compartment up to a gas pressure greater than the minimum pressure and repetition of the above mentioned method steps after a given waiting time.

SUMMARY OF THE INVENTION

It is therefore an object of the present invention to specify a novel service system for gas compartments.

A service system for gas compartments according to an exemplary embodiment of the invention comprises a gas treatment device for treating a gas present in at least one gas compartment, wherein the gas treatment device is designed to carry out a cleaning and/or a drying and/or a tempering of the gas, in particular to maintain or restore a functional capability of the gas. Furthermore, the service system comprises a sensor device for monitoring at least one gas property of the gas, wherein the sensor device is designed to detect as gas property a gas pressure and/or a gas density and/or a gas temperature and/or a gas humidity and/or a concentration of decomposition products in the gas, in particular to enable precise control of the gas treatment device, for example for dehumidifying and/or cleaning a gas. Furthermore, the service system comprises at least one connection coupled with the gas treatment device and the at least one sensor device, which is designed for coupling with the gas compartment, and at least one conveying device for conveying a gas from the gas compartment into the gas treatment device and from the gas treatment device at least indirectly back into the gas compartment. In addition, at least one control unit is provided which is connected at least to the sensor device and monitors and controls at least the conveying device and/or the gas treatment device.

The service system enables reliable gas treatment in at least one gas compartment, for example, a gas compartment of an electrical switchgear.

The service system can be designed to use the control unit to determine a gas volume in a connected gas compartment via a known volume of lines between the connection and the gas treatment device and/or a known volume of a connection hose in which the connection is formed and/or a known volume of a gas storage tank of the gas treatment device. Furthermore, the service system can be designed to use the control unit to successively flood the connection hose, the lines between the connection and the gas treatment device and the gas storage tank with gas one after the other when removing the gas from the gas compartment and to monitor the gas pressure within the gas compartment at the same time or to successively flood the gas compartment one after the other when removing the gas from the connection hose, to flood the lines between the connection and the gas treatment device and the gas storage tank with the extracted gas and at the same time to monitor the gas pressure within the gas compartment and to determine the gas volume in the gas compartment based on a pressure change detected during the monitoring of the gas pressure within the gas compartment. To monitor the gas pressure within the gas compartment, the control device uses, for example, a pressure sensor of the sensor device, which is for example connected as directly as possible to the gas compartment. Before the successive flooding or withdrawal of gas from the above-mentioned known volumes, a defined initial state is advantageously created, for example by evacuating these volumes or by pressurizing them with a predetermined pressure that is greater than the current operating pressure of the gas compartment. Also, or alternatively, the actual initial state can be determined by sensors within the service system. Subsequently, the described successive flooding or withdrawal of gas from the known volumes leads to a successive pressure equalization between these volumes and the gas compartment. Via the aforementioned design of the service system, a particularly precise, automatic determination of the internal free volume of a connected gas compartment is possible. The internal free volume of a gas compartment is a quantity which is often not even known exactly by the operator of the gas compartment. Therefore, this design enables the service system to determine the unknown volume and to execute safety-relevant control processes more reliably and efficiently by taking this variable into account. As a result of the determination of the volume of the gas compartment, it is possible, for example, to precisely set and control the amount of gas that can be withdrawn from the gas compartment during a gas treatment process without reaching or falling below a specified minimum pressure of the gas compartment.

Further, connection hoses with different lengths can be used. For this purpose, different defined lengths are specified and stored to determine the volume of a connection hose in which the connection is formed. It is also possible to manually enter a length and, if necessary, a cross section of a used connection hose via a user interface. This makes it possible, for example, to use connection hoses of great length in gas compartments that are difficult to reach and to dispense with hose extensions that are not pressure-monitored. At the same time, it is not necessary to use connection hoses that are as long as possible, so that the effectiveness of the gas treatment is not impaired.

The service system can also be designed to determine a lower first operating point and an upper second operating point with the control unit from a minimum pressure of the gas, a nominal pressure of the gas and a maximum pressure of the gas, wherein the lower first operating point is particularly above the minimum pressure and the upper second operating point is particularly below the maximum pressure. Furthermore, the service system can be designed to automatically start the gas treatment process with the control unit by introducing fresh gas into the gas compartment until the upper second operating point is reached, if the nominal pressure is closer to the lower first operating point than to the upper second operating point, to automatically start the gas treatment process by withdrawing gas from the gas compartment until the lower first operating point is reached, if the nominal pressure is closer to the upper second operating point than to the lower first operating point and/or when carrying out the gas treatment process, to select a gas volume removed from the respective gas compartment in such a way that a gas pressure within the gas compartment after the removal of the gas volume is above the minimum pressure, in particular above the lower first operating point. This enables a relatively large gas volume to be taken from the gas compartment for gas treatment without the gas pressure within the gas compartment being below the minimum pressure, wherein a treatment time is minimized due to the maximization of the gas volume withdrawn and the resulting minimization of a necessary waiting time until the mixing of gas freshly filled into the gas compartment and gas already present there. This ensures that the gas compartment, in particular any electrical equipment located within the gas compartment, e.g. a circuit breaker in operation, remains operational even during the gas treatment process, while at the same time a large volume of gas can be treated.

The minimum and maximum pressure are safety-relevant parameters of a gas compartment, which are usually specified by the manufacturer or operator of the gas compartment and must be maintained during operation of the gas compartment. The nominal pressure is usually also a specified value that describes the pressure with which the gas compartment should be filled during normal operation. This value is also called operating pressure or standard operating pressure. If the pressure within a gas compartment reaches the minimum or maximum pressure, this usually leads to the triggering of an alarm. For example, if the gas compartment is part of a gas-insulated switchgear or if the gas compartment contains electrical equipment, an alarm of this type may cause the equipment or the entire system to shut down because safe operation is then no longer ensured. Such an alarm event is often associated with enormous follow-up costs for the operator of the gas compartment. By defining the two operating points, the service system is able to avoid triggering an alarm during the gas treatment process, since it is set up to change the pressure within the gas compartment only within the interval between the lower first and the upper second operating point. Reaching the minimum or maximum pressure can thus be prevented, so that the service system can carry out gas treatment with high reliability and safety even on a gas compartment during operation.

In principle, such operating points can also be defined by user input, however, this requires that the user knows the safety and control-related parameters of the gas compartment and the service system from which safe operating points can be derived. The automatic determination of the operating points by the service system itself or by the control unit makes corresponding knowledge of the user superfluous and thus enables a simplified use of the service system with maximum reliability and safety.

In particular, the service system can be set up to use the control unit to determine the distance between the minimum pressure and the lower first operating point as well as the distance between the upper second operating point and the maximum pressure in such a way that a maximum measurement uncertainty of the sensor device, an absolute pressure within the gas compartment, a temperature of the gas, a regulation, control or response behavior of the control device and/or a temperature change within the gas compartment are or will be taken into account.

In a situation in which minimum pressure (Pmin), nominal pressure (Pnom) and maximum pressure (Pmax) are sufficiently far apart, the determination of the lower first working point (Pa1) and the upper second working point (Pa2) usually results in the following relationship between the pressures:

Pmin<Pa1<Pnom<Pa2<Pmax.

In such a case, very safe and reliable gas treatment is possible. However, if the distances between minimum pressure (Pmin), nominal pressure (Pnom) and maximum pressure (Pmax) are very small, situations can arise where the risk of alarm triggering during gas treatment increases. For example, both operating points determined by the control unit may be either above or below the nominal pressure. It can be difficult for a user to detect and correctly evaluate such a situation. Therefore, the service system can also be designed to use the operating points to determine with the control unit whether the gas treatment process can be safely carried out automatically. If the first lower operating point is higher than the nominal pressure, the service system can only start the gas treatment process if a user confirmation is given that the first lower operating point is equal to the nominal pressure. If the upper second operating point is lower than the nominal pressure, the service system can start the gas treatment process only after a user confirmation that the upper second operating point is equal to the nominal pressure. By equating an operating point with the nominal pressure, the distance to the nearest limit pressure (minimum pressure or maximum pressure) is reduced, but the risk of triggering an alarm or setting a dangerous pressure condition in the gas compartment is still significantly lower than if the operating point is set directly at the limit pressure. The service system therefore suggests a reasonable parameter adjustment to the user, which the user can accept, taking into account the risks. If both operating points are at the same value or if the upper second operating point is even lower than the lower first operating point, the service system interrupts the gas treatment process. This ensures that a user is automatically alerted to a wide range of risks and can efficiently decide which parameters should be adjusted if this is acceptable in view of the risks involved. This means that the service system can carry out gas treatment safely in a wide range of situations, while automatically preventing gas treatment in risky situations. This further contributes to simplifying the handling of the service system and enabling a high level of safety.

The gas treatment device can include at least one drying filter for the absorption of moisture. Such a drying filter enables a reliable drying of the gas and is available at low cost and easy to use. The gas treatment device can comprises, for example, at least two moisture sensors, wherein a first moisture sensor is coupled at least indirectly to an input of the at least one drying filter and a second moisture sensor is coupled at least indirectly to an output of the at least one drying filter. The moisture sensors are coupled at least to the control unit which determines a filling level of the at least one drying filter from moisture values determined via the moisture sensors. This enables a simple and reliable detection of the filling level of the at least one drying filter and consequently an evaluation of the level of moisture absorption of the drying filter. From this, it can be deduced how long gas has to remain in the drying filter or how often gas has to be pumped through it to achieve a desired drying effect.

The gas treatment unit can include at least two drying filters for the absorption of moisture, whereby the drying filters can be used alternately. This enables the at least one remaining drying filter to be dried while one drying filter is in use, for example by supplying warm air.

The sensor device or the control unit can be coupled, or coupled in a data technical or electrical manner, with at least one gas compartment sensor arranged in or on the gas compartment, which is part of a system comprising the respective gas compartment, for the detection of at least one gas property. The coupling can be done directly with the gas compartment sensor or indirectly via an interconnected control cabinet of the system. This leads to a significant reduction of complexity and costs of the service system due to the use of sensors already existing in the system comprising the gas compartments. Furthermore, the monitoring of the gas compartment sensors can be used as an additional safety function to safely detect a potentially dangerous condition of the gas compartment, e.g. a strong pressure drop in the gas compartment, and to shut down the service system if necessary. In particular, the gas compartment sensor can be an electronic pressure, temperature and/or gas density transmitter. Furthermore, it can be a so-called gas density monitor, which signals via a switching output when preset limit values of pressure and/or gas density are reached, e.g. when a preset minimum or maximum pressure of the gas compartment is reached.

The control unit can be coupled to at least one gas compartment monitoring unit, wherein the gas compartment monitoring unit is coupled to a control cabinet of the system or to a gas compartment sensor arranged in or on the gas compartment and wherein the gas compartment monitoring unit is designed to switch off the service system if a dangerous state of the gas compartment is signaled by the control cabinet or the gas compartment sensor. Thus, for example, switching signals can be tapped by the gas compartment monitoring unit, which are used for example for a safety shutdown or the triggering of an alarm due to switching points stored in the at least one gas compartment sensor, for example a gas density monitor. In this way, in the event of a safety shutdown of the system comprising the gas compartments, the service system can also be automatically deactivated by the gas compartment monitoring unit.

The service system can comprise at least two, for example, six, connections coupled to the gas treatment device and the at least one sensor device, each connection being designed for coupling to at least one gas compartment in each case. Furthermore, the control unit comprises a switching device for switching at least one switching element for opening and closing the connections, wherein the switching device is connected to the control unit, wherein the control unit is designed for automatic activation of the at least one switching element, so that a degree of automation and operating convenience can be increased and operating personnel can be saved. Due to the plurality of connections, a plurality of gas compartments, for example gas compartments of an electrical switchgear, can be coupled to the service system in a favorable manner at the same time and a gas treatment of a gas contained within each of the gas compartments can be carried out, in contrast to the solutions known from the state of the art, without dismantling a connection from one gas compartment and subsequent mounting to another gas compartment by switching between the different connections carried out via the switching device. On the one hand, this significantly reduces assembly and time expenditure and on the other hand, the longevity and operational safety of the connections and the service system and of corresponding connections of the gas compartments is significantly increased due to the reduced number of assembly and disassembly procedures. The connections can be designed in an advantageous way such that the service system can be operated even if there is no gas compartment connected to each of the available connections. For this purpose, the connections can be equipped with self-closing couplings, for example.

The switching device can comprise a plurality of decentralized switching elements, each of which is coupled to a connection and designed to open and close the corresponding connection. Such switching elements can be replaced or repaired individually in case of a defect, in contrast to a central switching element, thus keeping costs and material expenses very low. Furthermore, with the decentralized switching elements the individual connections can be opened and closed individually, so that a targeted control and execution of gas treatment processes at the connected gas compartments can be carried out individually.

The decentralized switching elements of the switching device can be arranged directly at the respective connection and enable a minimization of a dead volume starting from the gas compartment after the respective connection.

The respective decentralized switching element of the switching device and the associated connection can be formed in a connection hose. This enables a particularly simple, reliable and flexible coupling of the service system with the majority of gas compartments while at the same time ensuring easy handling. For example, one end of a connection hose is connected to the service system, while the switching element and the associated connection are arranged in a section at the other end of the connection hose. In this way, a connection to the gas compartment directly behind the coupling of the gas compartment to which the connection hose is connected can be shut off in an advantageous way. Thus, for example, in the event of a fault, for example if a leak occurs in the connection hose, an escape of gas from the gas compartment can be effectively prevented.

The sensor device can comprise a plurality of decentralized sensors for the detection of at least one gas property, each sensor being coupled to a respective connection. In case of a failure of one sensor, this configuration still allows for operation at the other connections.

The decentralized sensors of the sensor device can be located directly at the respective connection. In this example, it is possible to detect the gas properties particularly close to the respective connection and thus to the respective gas compartment.

The respective decentralized sensor of the sensor device and the associated connection can be formed in a connection hose. This enables a particularly simple, reliable and flexible coupling of the service system with the majority of gas compartments while at the same time allowing easy handling.

A respective decentralized sensor and a respective decentralized switching element can be arranged at an associated connection or associated end of a connection hose in such a way that the sensor communicates with a line section between the gas compartment and the switching element. Thus, a gas property of the gas compartment can be monitored by the sensor even if the connection is closed by the switching element. This enables an uninterrupted monitoring of gas compartments by the service system, which increases the safety of the system operation; furthermore, the state of the gas compartment can be detected before the switching valve is opened and be processed, especially via safety-relevant functions.

The switching device can comprise at least one central switching element which is coupled to a plurality of connections and is designed to open and close a plurality of connections. Such a central switching element results in low material and cost expenditure and is easy to control.

The at least one central switching element can be located in a central switch box on the service system and is therefore particularly easy to access, for example for maintenance.

The sensor device can be designed as a sensor block, especially as an accessory, and can, for example, also be retrofitted to the system comprising the gas compartments.

The sensor device can comprise at least one central sensor for the detection of at least one gas property, which is coupled with a plurality of connections. Because only one sensor is required for all connections, such a central sensor causes a low material and cost expenditure and is easy to operate.

Each connection can comprise a separate gas inlet and a separate gas outlet and the conveying device and the gas treatment device are designed for a continuous execution of a gas treatment process in which gas is continuously extracted from a gas compartment, the gas is treated and then the treated gas is returned to the gas compartment. Such a continuous process allows for a permanent drying of the gas in a simple way.

Each connection can be designed as a gas inlet or as a gas outlet as a function of a conveying direction of the conveying device and a switching state of the switching device. In such an embodiment, the gas treatment can be carried out in any gas compartment, which has at least one corresponding connection. Furthermore, the gas treatment is separated from the inside of the gas compartment due to the separation via the switching device, whereby a very high process safety is achieved.

The service system can be designed to use the control unit to determine a treatment time of the gas during the continuous execution of the gas treatment process as a function of a continuously determined value of a gas property and to adjust it dynamically as a function of this value. Thus, the treatment time can be easily adapted to the corresponding gas property and the application can be further automated.

The service system can be designed to use the control unit to cyclically extract gas from a gas compartment through a connection in a gas treatment process, treat the gas and then return the treated gas to the gas compartment through the same connection. This cyclical gas treatment is very effective and due to the separation via the switching device it is separated from the inside of the gas compartment, whereby a high process safety can be achieved.

The service system can be designed to use the control unit to determine a number of cycles of treatment of the gas during the cyclic execution of the gas treatment process as a function of a continuously determined value of a gas property and to adjust it dynamically as a function of this value. Thus, the number of cycles and the resulting treatment time of the gas can be easily adapted to the corresponding gas property and controlled. Furthermore, the determined, estimated treatment time can be displayed via a user interface, so that the use and availability of the service system can be better planned by a user.

The service system can be designed to simultaneously or substantially simultaneously carry out a gas treatment process with the control unit for a plurality of gas compartments. Here, a simultaneous gas treatment can be carried out for a plurality of or all gas compartments simultaneously.

The service system can be designed to use the control unit to continuously determine during a gas treatment process at least one gas property of the gas from the gas compartment with the sensor device and to provide determined data in a time series representation in a graphically visualized manner via a user interface, the control unit being designed in particular to extrapolate the determined data and to graphically visualize the extrapolated data as a predicted course attached to the time series representation via the user interface. Thereby, a graphical live display of a time series can be realized for a user.

The service system can be designed to use the control unit to carry out or control the gas treatment process cyclically alternating in a fixed sequence for each gas compartment. Such an execution of the gas treatment process is very simple and reliable.

The service system can be designed to determine and control with the control unit a sequence and/or frequency of the execution of the gas treatment process as a function of actual values of at least one gas property for each gas compartment. Hereby, an adapted gas treatment, individual for each gas compartment, can be executed.

The service system can be designed to determine and control a sequence and/or frequency of the execution of the gas treatment process with the control unit as a function of a respective gas volume of the gas compartments. In particular, gas treatment in gas compartments with large volumes is carried out more frequently than in gas compartments with small volumes, since gas treatment is generally more complex or takes longer due to the larger volume.

The service system can be designed to determine and control with the control unit a sequence and/or frequency of the execution of the gas treatment process as a function of a respective leakage rate of the gas compartments, wherein the leakage rate is determined beforehand by logging an operating pressure of the gas compartment over a test period, for example, of 14 days. In particular, the leakage rates can be taken into account when determining the waiting time until the next treatment cycle or when determining the sequence of the gas compartments for gas treatment, thus making the treatment more efficient.

The service system can be designed to determine and control a sequence and/or frequency of the gas treatment process with the control unit, as a function of a pre-selected preference. Thus, for example, gas compartments can be provided with a higher preference, the gas treatment of which is most important, for example due to frequency of use.

The service system can be designed to carry out the gas treatment process with the control unit until a specified setpoint value of at least one gas property is reached and to carry out the gas treatment process for a further gas compartment after the setpoint value is reached. Here, the gas property can comprise a gas humidity, a concentration of decomposition products and/or a gas purity. This gas property is detected in particular by the sensor device, e.g. by a sensor that is directly attached to a connection or in a connection at the end of a connection hose. Thus, the gas treatment can be automated in a particularly simple and reliable way.

The service system can be designed to use the control unit to interrupt the gas treatment process in one gas compartment prematurely if a limit value is exceeded in another gas compartment, and to initiate emergency gas treatment in the other gas compartment. Thus, the gas treatment can be carried out in a respective gas compartment as a function of a requirement, before the limit value is exceeded by a predetermined amount.

The service system can be designed to use the control unit before a gas treatment process is carried out on the gas compartment to maintain a predetermined waiting time after a gas treatment process previously carried out on the same gas compartment, in order to achieve complete mixing of the gas in the gas compartment and to prevent a gas volume with a large proportion of gas treated immediately before being sucked in again and treated again. Thus, a uniform and effective treatment of the gas is achieved.

The control unit can be designed to use the control unit to set the waiting time as a function of a volume of the gas compartment, wherein the waiting time increases as the volume increases, or to set the waiting time as a function of a filling level of at least one filter of the gas treatment device, or to set the waiting time as a function of a leakage rate of the gas compartment, wherein the leakage rate is determined beforehand by logging an operating pressure of the gas compartment over a test period. This enables an exact adaptation of the waiting time to parameters of the gas compartment and/or the gas treatment device.

The control unit can be designed to set the waiting time as a function of a gas property of a gas inside the gas compartment. This enables an exact adjustment of the waiting time to the gas property of a gas inside the gas compartment.

The service system can be designed to carry out the gas treatment process for a further gas compartment during the waiting time of the previous gas compartment, which must be observed. Thus, the waiting time can be used to carry out gas treatment for another gas compartment. In this way, dead times or idle times can be avoided and the gas treatment of a plurality of gas compartments can be carried out particularly quickly and efficiently.

The service system can be designed to increase a gas pressure within the gas compartment to a value above a standard operating pressure using the control unit before the gas treatment process is carried out. This enables a larger gas volume to be taken from the gas compartment for gas treatment without the gas pressure within the gas compartment being below a specified minimum setpoint. This ensures that the gas compartment, in particular any electrical equipment located within the gas compartment, e.g. a circuit breaker, can be operated even during gas treatment with a large treatable gas volume.

The service system can be designed to determine and control a gas volume of treated gas returned to the respective gas compartment during the gas treatment process via the control unit in such a way that a gas pressure in the gas compartment corresponds to the standard operating pressure after the complete return of the gas volume and thus the operating capability of the gas compartment, in particular of the electrical equipment located within the gas compartment, is optimized.

The service system can be designed to determine and control a gas volume removed from the respective gas compartment via the control unit during the gas treatment process in such a way that a gas pressure within the gas compartment is above a specified minimum setpoint value after complete removal of this gas volume. Here too, the operability of the gas compartment, in particular of the electrical equipment located within the gas compartment, is ensured.

The service system can comprise an internal sensor device for monitoring at least one gas property of the gas in the gas treatment device, a recycling unit for exchanging and, for example, processing the gas from the gas treatment device and a conveying device for conveying gas from the gas treatment device to the recycling unit and vice versa. This enables the service system to carry out further gas treatment processes and improve the safety and functioning of its application.

The conveying device may be the same device that is set up to convey gas between a gas compartment and the gas treatment device. This makes it possible to achieve a particularly compact design. However, the service system can also include a second conveying device for this purpose, so that the gas conveyance between the relevant gas compartment and the gas treatment device on the one hand and the gas conveyance between the gas treatment device and the recycling unit on the other hand are carried out by different conveying devices. In particular, a second conveying device and the recycling unit may be housed in a separate module or system which is fluidically connected to the service system. In this way, a simpler construction can be achieved and the service system can be designed modularly.

A limit value is or can be stored in the control unit for at least one gas property of the gas in the gas treatment device. The service system can be set up to monitor and detect with the control unit an exceeding of this limit value of the gas property of the gas in the gas treatment device during a gas treatment process by the internal sensor device. If an excess is detected, the service system with the control unit can be set up to stop the gas treatment process and then to empty the gas treatment device with a conveying device, in particular to evacuate it. Subsequently, the gas from the gas treatment device can be reprocessed in the recycling unit or stored in a storage tank of the recycling unit. Further, the service system with the control unit can be set up to refill the gas treatment device with recycled gas from the recycling unit or with clean gas from a clean gas storage tank of the recycling unit before the next gas treatment process is started. Thus, safe operation of the service system can be improved and the service system is able to perform gas treatment effectively in the long run. If, for example, the safety or effectiveness of gas treatment could be jeopardized by exceeding the limit value, the service system can be set up to automatically perform a complete replacement of the gas remaining in the unit and thus restore an initial state in which safety and effectiveness of gas treatment are not endangered.

In this context, clean gas can be understood to be a gas in which a limit value of a certain gas property is not exceeded. However, it can also be a mixed gas. Clean does not necessarily mean that only one gas species is present. Which gas property is involved and which limit value is given depends on the respective application.

The recycling unit can include a particle filter or a chemical filter or a compression unit for compressing and liquefying at least one component of the gas and for separating at least one liquid phase and one gas phase. This enables the recycling unit to be particularly effective in reprocessing the gas from the gas treatment device and removing unwanted impurities from the system.

The internal sensor device can be designed to monitor a concentration of decomposition products in the gas in the gas treatment device, wherein the limit value refers to a maximum permissible concentration of decomposition products. For applications with sulfur hexafluoride ($SF_6$) as protective gas, the concentration of decomposition products can be, for example, a volume percentage of air and/or tetrafluoromethane ($CF_4$) in the protective gas volume. According to IEC 60480, a limit value for such impurities is e.g. three percent by volume. In this embodiment, the service system can also be used particularly advantageously to reduce the concentration of decomposition products in a gas compartment step by step. With each gas treatment process, the gas from the gas compartment is mixed with the gas stored in the gas treatment device. During mixing, the concentration of the decomposition products is reduced because the gas in the gas treatment device initially has a lower concentration than the gas from the gas compartment. The remaining concentration of decomposition products enriched in the gas treatment device after one or more gas treatment processes can be automatically reduced, i.e. removed from the system, at certain intervals via a conveying system and the recycling unit. Thus, the service system is suitable, for example, for simultaneous drying and recycling of a protective gas from a gas compartment, while the operating material in the gas compartment can be in operation.

A setpoint value and/or a permissible deviation from a setpoint value are or can be stored in the control unit for each gas property and each gas compartment. In this way, the control of the gas treatment device can be further improved and automated as a function of the at least one gas property.

The control unit is coupled or can be coupled with a storage device and is designed to read out the respective setpoint value and/or the permissible deviation from the setpoint value from the storage device and assign it to an associated gas compartment. The control unit can also be set up to store saved setpoint values and/or permissible deviations from setpoint values of a gas property for a gas compartment in the storage device.

The control unit can be designed to initially detect the respective gas property at a gas compartment via the sensor device and to store it as a setpoint value in order to determine the setpoint value, and/or the control unit is coupled to or comprises an input device, wherein the input device is designed to manually input the respective setpoint value and/or as a wirelessly connected mobile terminal. By the initial acquisition of the gas property for the determination of the setpoint value, a particularly precise determination of the setpoint value adapted to a current situation can be carried out. The manual input of the respective setpoint value is particularly simple and is characterized by a particularly high reliability.

The gas treatment device can include a drying unit, which is designed to dry the gas by cooling and condensation of water vapor. This design also enables reliable drying of the gas and is characterized by low maintenance and operating costs.

The conveying device can be designed to convey as gas sulfur hexafluoride, nitrogen, carbon dioxide, air, a fluoronitrile, a fluoroketone and/or a mixture of at least two of the aforementioned gases, and the gas treatment device is designed to treat as gas sulfur hexafluoride, nitrogen, carbon dioxide, air, a fluoronitrile, a fluoroketone and/or a mixture of at least two of the aforementioned gases. Thus, the service system is particularly suitable for gas treatment in electrical switchgear in which protective gases are used.

The service system can be designed for the treatment of gases stored under overpressure in gas compartments. Thus, the service system is particularly suitable for gas treatment in electrical switchgear, in which the gas is stored under overpressure within the gas compartment.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
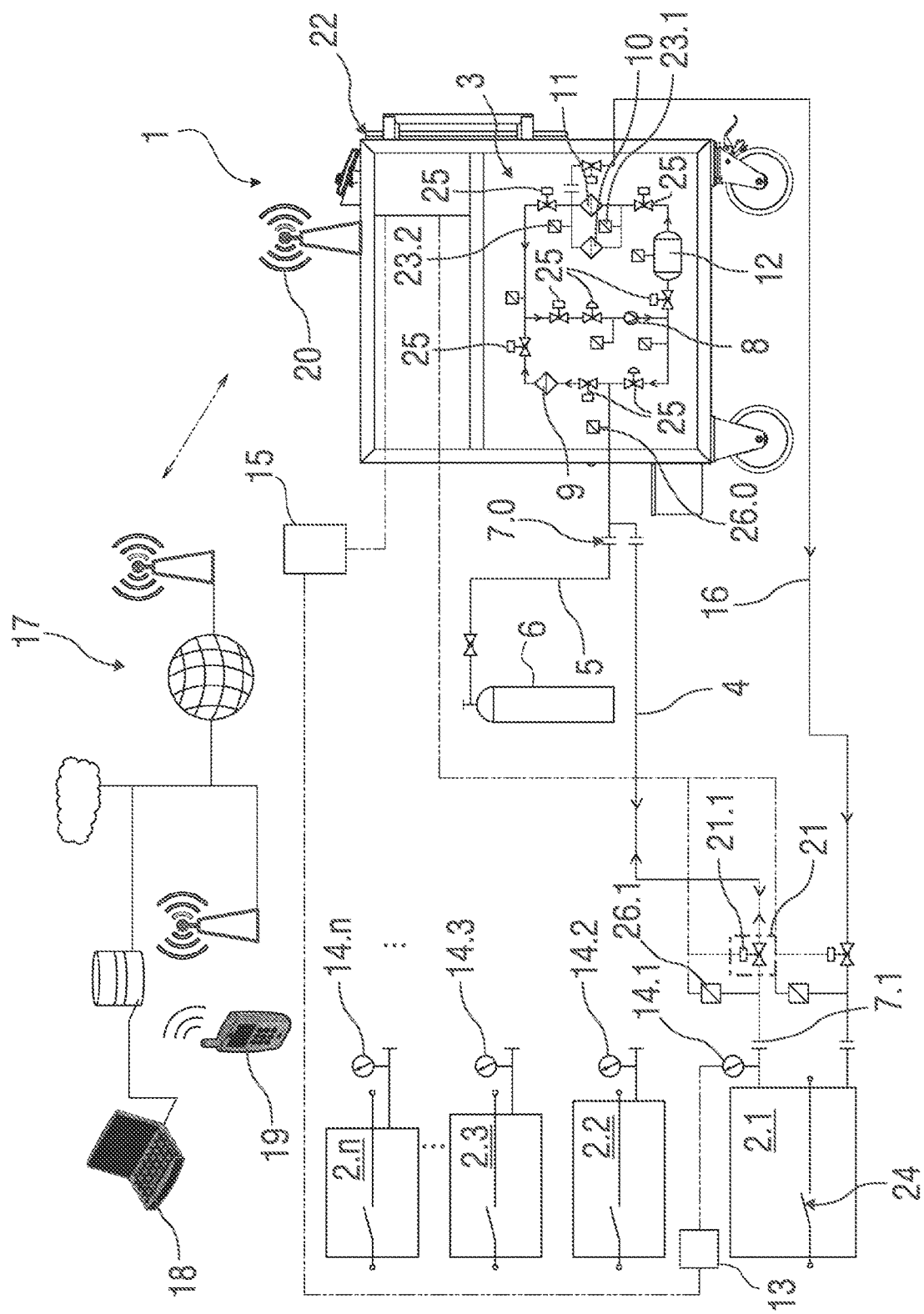
FIG. 1 shows a schematic view of a service system for gas compartments and a plurality of gas compartments.

FIG. 1 shows a schematic view of an exemplary embodiment of a service system 1 for gas compartments 2.1 to 2.$n$ and a plurality of gas compartments 2.1 to 2.$n$.

The gas compartments 2.1 to 2.$n$ are, for example, part of an electrical switchgear and each form, for example, a container for gas-insulated electrical equipment 24 such as an electrical circuit breaker. The gas compartments 2.1 to 2.$n$ are filled with an insulating and quenching gas as a protective gas, for example sulfur hexafluoride, $SF_6$ for short, nitrogen, carbon dioxide, air, a fluoronitrile, a fluoroketone and/or a mixture of at least two of the aforementioned gases, which is enclosed in the corresponding gas compartment 2.1 to 2.$n$ under a predetermined minimum pressure, for example 6 bar overpressure, and which causes an arc to be quenched which is generated between electrical contacts when they are opened. Safe functioning depends in particular on the purity of the protective gas and on the containment of the gas under a pressure which does not fall below a predetermined minimum pressure and does not exceed a predetermined maximum pressure, in particular on the containment of the gas under a predetermined nominal or operating pressure.

To ensure this purity, the service system 1 comprises a gas treatment device 3, which is designed to perform cleaning and/or drying and/or temperature control of the gas. Furthermore, service system 1 comprises at least one control unit 22, which monitors and controls at least some of the system's components.

The gas treatment device 3 is coupled to gas compartment 2.1 via a first gas line 4 and to a gas cylinder 6 via a second gas line 5, wherein the first gas line 4 comprises a connection 7.1 for coupling to a gas compartment 2.1 to 2.$n$. The first gas line 4 can be designed in particular as a connection hose, which is arranged as a connection between the connection 7.1 to gas compartment 2.1 and a connection 7.0 at the service system 1.

The gas treatment device 3 comprises a conveying device 8 for conveying the gas from the gas compartment 2.1 into the gas treatment device 3 and from the gas treatment device 3 at least indirectly back into the gas compartment 2.1. The conveying device 8 is designed as a compressor, for example.

Furthermore, the gas treatment device 3 comprises a drying unit with a plurality of drying filters 9 to 11 and/or particle filters to absorb moisture from the gas. The drying filters 10 and 11 can be used alternately, so that while one drying filter 10, 11 is in use, the at least one remaining drying filter 11, 10 can be dried, e.g. by supplying warm air.

The gas treatment device 3 comprises at least one pair of moisture sensors 23.1, 23.2, wherein in each case a first moisture sensor 23.1 is coupled at least indirectly, for example directly, to an input of the corresponding drying filter 9 to 11 and in each case a second moisture sensor 23.2 is coupled at least indirectly, for example directly, to an output of the corresponding drying filter 9 to 11. The moisture sensors 23.1, 23.2 are coupled to an evaluation unit which determines a filling level of the drying filters 9 to 11 from humidity values determined via the moisture sensors 23.1, 23.2 and from this determines a required dwell time of the gas in the drying filters 9 to 11 and/or a point in time and a time duration for drying the same.

As an alternative or in addition to the use of drying filters 9 to 11, a drying unit is provided which is designed to dry the gas by cooling and condensing liquid components of the gas.

Furthermore, the gas treatment device 3 comprises a plurality of switching valves and/or pressure control valves 25. These are connected in such a way that the above described admission of the drying filters 9 to 11 and a bidirectional conveying of the gas from the gas compartment 2.1 into the gas treatment device 3 and from the gas treatment device 3 back into the gas compartment 2.1 with the conveying device 8 is possible. For this purpose, the connection 7.1 is designed as gas inlet or gas outlet as a function of the direction of conveyance.

For cleaning, in particular drying, of the gas in the gas compartment 2.1, a part of the gas, in particular gas at overpressure in gas compartment 2.1, is conveyed via the conveying device 8 to the gas treatment device 3 and stored in a gas storage tank 12.

In order to ensure the continued operation of the high-voltage equipment located in gas compartment 2.1, a gas volume removed from gas compartment 2.1 is selected in such a way that a gas pressure within gas compartment 2.1 after removal of the gas volume is above a specified minimum setpoint, in particular a specified minimum pressure.

The service system 1 includes a sensor device with sensors 26.0, 26.1, for monitoring at least one gas property. For example, a sensor 26.1 can be assigned to connection 7.1. A further sensor 26.0 or a plurality of further sensors can be arranged within service system 1. With the help of the sensors 26.0, 26.1 of the sensor device, the service system can monitor the condition of the gas compartment 2.1 and detect a dangerous condition at an early stage. This means that the service system can also be used while electrical equipment 24 located in gas compartment 2.1 is in operation.

The control unit 22 first determines two operating points from a minimum pressure of the gas, a nominal pressure of the gas and a maximum pressure of the gas, wherein a first operating point lies between the minimum pressure and the nominal pressure and a second operating point lies between the nominal pressure and the maximum pressure.

In order to increase the quantity of gas that can be treated in one cycle, before the gas is withdrawn from gas compartment 2.1, the gas pressure within gas compartment 2.1 is increased to a value above the nominal pressure, in particular a standard operating pressure, but below the maximum pressure (for example to a determined second operating point), in order to subsequently select the withdrawn gas volume in such a way that the gas pressure within gas compartment 2.1 is above the minimum pressure after the withdrawal of the gas volume (for example to a determined first operating point). The initial increase of the gas pressure is carried out, for example, on the basis of gas stored in the gas cylinder 6 or on the basis of gas already stored in the gas storage tank 12.

The service system 1 may be set up to determine the internal volume of gas compartment 2.1 via a volume of a connection hose in which connection 7.1 is formed, a volume of lines between connection 7.0 on the service system 1 and the gas treatment device 3 and a volume of the gas storage tank 12. For this purpose, a defined initial state is first established within these mentioned known volumes, for example by evacuating these volumes, or the existing initial state is determined via sensors 26.0 within the service system 1. During the following withdrawal of the gas from the gas compartment 2.1, the gas line 4, which is designed as a connection hose, the lines between connection 7.0 and the gas treatment device 3 and the gas storage tank 12 are successively flooded with the gas. At the same time, the gas pressure within the gas compartment 2.1 is monitored via the sensor 26.1 in order to detect and avoid the risk of falling below the minimum pressure at an early stage. At the same time, the pressure drop during the successive flooding of the volumes of the gas line 4, which is designed as a connection hose, the lines and the gas storage tank 12 can be used to determine the internal volume of gas compartment 2.1, if the other volumes are known.

Then the extracted gas is passed through the drying filters 10, 11 once or several times via the conveying device 8, as a function of at least one previously initially determined gas property, e.g. moisture, until a setpoint value of the gas property is reached. This means that the service system 1 with the control unit 22 is designed to determine and set a number of cycles of the treatment of the gas during a cyclic execution of the gas treatment process as a function of an initially determined value of a gas property.

For the determination of the at least one gas property, the service system 1 comprises a sensor device, which comprises at least one central sensor 26.0 for the detection of the at least one gas property. The sensor device may also comprise a plurality of sensors 26.0, 26.1 for the detection of at least one gas property or several gas properties. The at least one sensor 26.1 together with the associated connection 7.1 can be located in a gas line 4 which is designed as a connection hose.

The sensor device is designed to detect as gas property a gas pressure and/or a gas density and/or a gas temperature and/or a gas humidity and/or a concentration of decomposition products in the gas, wherein the gas treatment is carried out as a function of one or more of these gas properties.

For this purpose, a setpoint value and/or a permissible deviation from a setpoint value is or can be stored in the control unit 22 for each gas property and each gas compartment 2.1 to 2.*n*.

The control unit 22 may be designed to initially detect the respective gas property at a gas compartment 2.1 to 2.*n* via the sensor device and to store it as a setpoint value. Alternatively or additionally, the control unit 22 is coupled with or includes an input device for manual input of the respective setpoint value.

The control unit 22 is also coupled or can be coupled with a storage device. The control unit 22 can be designed to read out the respective setpoint value and/or the permissible deviation from the setpoint value from the storage device and to assign it to an associated gas compartment 2.1 to 2.*n*.

Furthermore, the sensor device or the control unit 22 can be coupled or connectable with at least one gas compartment sensor 14.1 to 14.*n* arranged in or on the gas compartment 2.1 to 2.*n*, which is a component of the system comprising the respective gas compartment 2.1 to 2.*n*, in this case the switchgear, for the detection of at least one gas property via data technology or electrically, wherein the coupling is effected via a control cabinet 13 of the system.

In particular, a control cabinet 13 can be coupled with one or more gas compartment sensors 14.1 to 14.*n* and monitor them centrally. The gas compartment sensors 14.1 to 14.*n* can be designed in particular as gas density monitors, which emit a switching signal when the gas density exceeds or falls below specified limit values, which can be used, for example, for an emergency shutdown of the entire system.

Furthermore, the control unit 22 is coupled or can be coupled with at least one gas compartment monitoring unit 15, wherein the gas compartment monitoring unit 15 is coupled with a control cabinet 13 of the system or with a gas compartment sensor 14.1 arranged in or on the gas compartment 2.1 and wherein the gas compartment monitoring unit 15 is set up to switch off the service system 1 if a dangerous state of the gas compartment 2.1 is signaled by the control cabinet 13 or the gas compartment sensor 14.1. A dangerous state can be characterized, for example, by a pressure drop below a permissible minimum pressure or by exceeding or falling below another limit value of a gas property.

After treatment of the gas, the treated gas may be returned to the gas compartment 2.1 either via the same gas line 4 or via a further gas line 16, wherein a volume of treated gas returned to the gas compartment 2.1 is selected, for example, in such a way that a gas pressure in the gas compartment 2.1 corresponds to the standard operating pressure after the gas volume has been completely returned.

This means that the service system 1 with the control unit 22 can be set up to control the conveying device 8 and gas treatment device 3 in such a way that in a gas treatment process, gas is cyclically extracted from the gas compartment 2.1 through the connection 7.1, the gas is treated and then the treated gas is returned to the gas compartment 2.1 through the same connection 7.1.

In order to enable a homogeneous treatment of the gas and to avoid that immediately previously treated gas is immediately returned to the gas treatment device 3 for treatment, a predetermined waiting period shall be observed before a new gas treatment process is carried out in the gas compartment 2.1 since the gas treatment process previously carried out in the same gas compartment 2.1. The waiting time is set by the control unit 22, for example, as a function of the volume of gas compartment 2.1, wherein the waiting time increases as the volume increases. Alternatively, the waiting time is set as a function of a filling level of at least one filter, for example a drying filter 9 to 11, of the gas treatment device 3. Alternatively, the waiting time is set as a function of a leakage rate of the gas compartment 2.1, wherein the leakage rate is determined beforehand by logging an operating pressure of the gas compartment 2.1 over a test period, for example a period of 14 days.

For a data exchange with at least one external data processing unit 17 and terminals 18, 19 coupled with it, the service system 1 comprises at least one corresponding communication interface 20.

Figure 2:
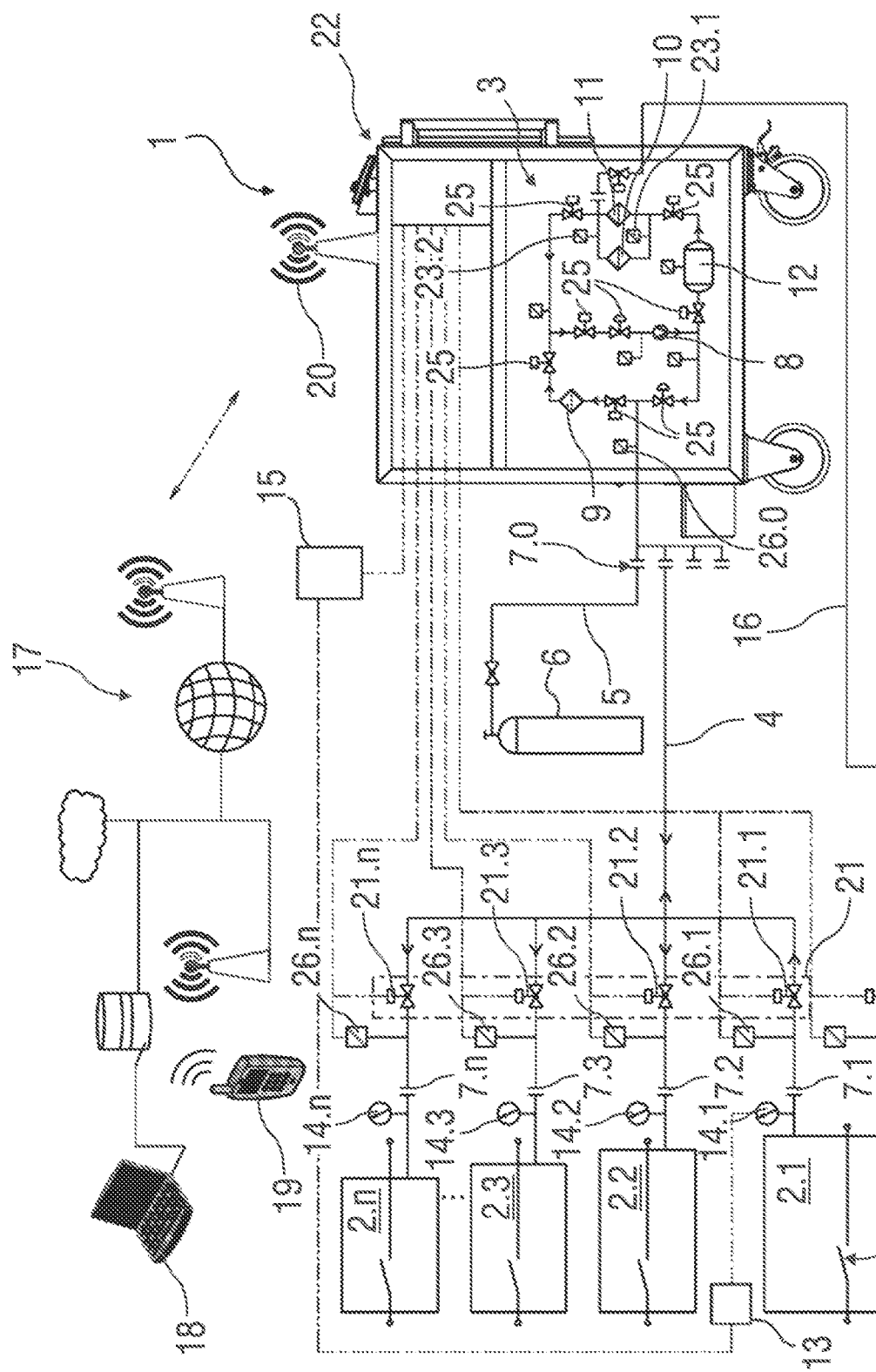
FIG. 2 shows a schematic view of a service system for gas compartments and a plurality of gas compartments.

FIG. 2 shows a schematic view of an exemplary embodiment of a service system 1 for gas compartments 2.1 to 2.*n* and a plurality of gas compartments 2.1 to 2.*n*.

The service system 1 comprises a plurality of connections 7.1 to 7.*n* coupled to the gas treatment device 3 and the at least one sensor device, each connection 7.1 to 7.*n* being designed for coupling to at least one gas compartment 2.1 to 2.*n* in each case.

Furthermore, the service system 1 comprises a switching device 21 for switching at least one, in the exemplary embodiment shown a plurality of decentralized switching elements 21.1 to 21.*n*, for opening and closing the connections 7.1 to 7.*n*. Alternatively, a central switching element can also be provided.

The switching device 21 is connected to the control unit 22, which is designed for automatic control of the switching elements 21.1 to 21.*n*.

The decentralized switching elements 21.1 to 21.*n* are each coupled to a connection 7.1 to 7.*n* and are designed to open and close the corresponding connection 7.1 to 7.*n*. The decentralized switching elements 21.1 to 21.*n* are, for example, arranged directly at the respective connection 7.1 to 7.*n* and are designed together with the respective connection 7.1 to 7.*n* in a connection hose or at the end of a connection hose.

Decentralized sensors 26.1 to 26.*n* of the sensor device can also be arranged directly at the respective associated connection 7.1 to 7.*n* and, for example, are designed together with the associated connection 7.1 to 7.*n* and the associated switching element 21.1 to 21.*n* in a connection hose or at the end of a connection hose.

The gas treatment is carried out for each individual gas compartment 2.1 to 2.n in line with the description of the exemplary embodiment shown in FIG. 1, wherein the gas compartments 2.1 to 2.n are, however, in particular permanently, i.e. at least for one treatment period, simultaneously coupled with the service system 1. This coupling can be achieved in particular via a plurality of connection hoses, wherein at least one connection hose per gas compartment 2.1 to 2.n is used. For the connection of the connection hoses, a plurality of connections 7.0 can be provided at the service system 1.

The service system 1 with the control unit 22 can also be additionally designed to control the conveying device 8, the switching device 21 and the gas treatment device 3 in such a way that the gas treatment process is carried out cyclically alternating in a fixed sequence for each gas compartment 2.1 to 2.n.

A sequence and/or frequency of the execution of the gas treatment process can be determined and controlled by the control unit 22 as a function of actual values of at least one gas property for each gas compartment 2.1 to 2.n. Alternatively or additionally, the control of the sequence and/or frequency of the execution of the gas treatment process is carried out as a function of the respective gas volume of the gas compartments 2.1 to 2.n.

The control of the sequence and/or frequency of the execution of the gas treatment process can take place as a function of the respective leakage rate of the gas compartments 2.1 to 2.n and/or as a function of a preselected preference.

Furthermore, the gas treatment is carried out in particular until a predetermined setpoint value of at least one gas property is reached, wherein after reaching the setpoint value the gas treatment process can be carried out for a further gas compartment 2.1 to 2.n.

For example, the gas treatment process for the further gas compartment 2.1 to 2.n is carried out during the waiting time of the previous gas compartment 2.1 to 2.n to be observed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A service system for at least one gas compartment, the service system comprising:
    a gas treatment device to treat a gas present in the at least one gas compartment, the gas treatment device configured to carry out cleaning and/or drying and/or temperature control of the gas;
    at least one sensor device to monitor at least one gas property of the gas, the sensor device configured to detect as the gas property: a gas pressure and/or a gas density and/or a gas temperature and/or a gas humidity and/or a concentration of decomposition products in the gas;
    at least one connection coupled to the gas treatment device and the at least one sensor device, the at least one connection configured for coupling to the at least one gas compartment;
    at least one conveying device to convey a gas from the at least one gas compartment into the gas treatment device and from the gas treatment device at least indirectly back into the at least one gas compartment; and
    at least one control unit connected at least to the sensor device, the at least one control unit monitors and controls at least the conveying device and/or the gas treatment device,
    wherein the service system is connected to the control unit to detect a gas volume in the at least one gas compartment that is connected based on:
    a known volume of lines between the connection and the gas treatment device; and/or
    a known volume of a connection hose in which the connection is formed; and/or
    a known volume of a gas storage tank of the gas treatment device, and
    wherein the service system is configured:
        to flood the connection hose, the lines between the connection and the gas treatment device and the gas storage tank with gas one after the other in stages as the gas is withdrawn from the at least one gas compartment, such that pressure is successively equalized between the at least one gas compartment and the connection hose, the lines between the connection and the gas treatment device and the gas storage tank, and at the same time to monitor the gas pressure within the at least one gas compartment or to flood the at least one gas compartment with gas removed from the connection hose, the lines between the connection and the gas treatment device and the gas storage tank with the gas removed, such that pressure is successively equalized between the at least one gas compartment and the connection hose, the lines between the connection and the gas treatment device and the gas storage tank, and to monitor the gas pressure within the at least one gas compartment; and
        to determine the gas volume in the at least one gas compartment via a pressure change determined during the monitoring of the gas pressure within the at least one gas compartment.

2. The service system according to claim 1, wherein the service system is connected to the control unit:
    to determine a lower first operating point and an upper second operating point from a minimum pressure of the gas, a nominal pressure of the gas and a maximum pressure of the gas;
    to start the gas treatment process automatically by introducing fresh gas into the at least one gas compartment until the upper second working point is reached, if the nominal pressure is closer to the lower first working point than to the upper second working point;
    to start the gas treatment process automatically with an extraction of gas from the at least one gas compartment until the lower first operating point is reached, if the nominal pressure is closer to the upper second operating point than to the lower first operating point; and/or
    to select, during the execution of the gas treatment process, a gas volume removed from the at least one gas compartment such that a gas pressure within the at least one gas compartment is above the minimum pressure after the removal of the gas volume.

3. The service system according to claim 2, wherein the service system determines with the control unit on the basis of the operating points whether the gas treatment process can be carried out, in which case the service system:
    If the first lower operating point is higher than the nominal pressure, starts the gas treatment process only after a user confirmation that the first lower operating point is set equal to the nominal pressure, If the upper second operating point is lower than the nominal pressure, starts the gas treatment process only if a user confirmation is provided that the upper second operating point is set equal to the nominal pressure, and if both operating points are at the same value or the upper second operating point is lower than the lower first operating point, the gas treatment process is stopped.

4. The service system according to claim 1, wherein the gas treatment device comprises at least one drying filter for absorbing moisture and/or the gas treatment device comprises at least two moisture sensors, wherein a first moisture sensor is at least indirectly coupled to an input of the at least one drying filter, wherein a second moisture sensor is coupled at least indirectly to an output of the at least one drying filter, and wherein the first and second moisture sensors are coupled at least to the control unit, which determines a filling level of the at least one drying filter from moisture values determined via the moisture sensors.

5. The service system according to claim 1, wherein the sensor device or the control unit is coupled or adapted to be coupled in terms of data technology or electrically to at least one gas compartment sensor that detects at least one gas property and is arranged in or on the at least one gas compartment and is a component of a system comprising the at least one gas compartment, the coupling being effected via a control cabinet of the system, and/or wherein the control unit is coupled or is adapted to be coupled to at least one gas compartment monitoring unit, the gas compartment monitoring unit being coupled or adapted to be coupled to a control cabinet of the system or to a gas compartment sensor arranged in or on the at least one gas compartment, and wherein the gas compartment monitoring unit is configured to switch off the service system if a dangerous state of the at least one gas compartment is signaled by the control cabinet or the gas compartment sensor.

6. A service system for at least one gas compartment, the service system comprising:
   a gas treatment device to treat a gas present in the at least one gas compartment, the gas treatment device configured to carry out cleaning and/or drying and/or temperature control of the gas;
   at least one sensor device to monitor at least one gas property of the gas, the sensor device configured to detect as the gas property: a gas pressure and/or a gas density and/or a gas temperature and/or a gas humidity and/or a concentration of decomposition products in the gas;
   at least one connection coupled to the gas treatment device and the at least one sensor device, the at least one connection configured for coupling to the at least one gas compartment;
   at least one conveying device to convey a gas from the at least one gas compartment into the gas treatment device and from the gas treatment device at least indirectly back into the at least one gas compartment;
   at least one control unit connected at least to the sensor device, the at least one control unit monitors and controls at least the conveying device and/or the gas treatment device;
   at least one additional connection coupled to the gas treatment device and the at least one sensor device, wherein the at least one additional connection is designed for coupling to at least one additional gas compartment; and
   a switching device connectable to a circuit of at least one switching element for opening and closing the at least one connection and the at least one additional connection, the switching device being connected to the control unit, the control unit automatically controlling the at least one switching element,
   wherein the switching device comprises at least two decentralized switching elements that are each coupled to the at least one connection and the at least one additional connection, respectively, and are designed to open and close their corresponding connection and/or are arranged directly at the respective associated connection and/or are each formed with their associated connection in a connection hose,
   wherein the service system is designed to observe with the control unit before carrying out a gas treatment process in the at least one gas compartment or the at least one additional gas compartment, a predetermined waiting time of a gas treatment process previously carried out in the same gas compartment, and
   wherein the service system is designed to carry out the gas treatment process for a further compartment during the waiting period of the previous gas compartment to be observed.

7. The service system according to claim 6, wherein the at least one sensor device comprises:
   at least two decentralized sensors for detecting at least one gas property, wherein the at least two decentralized sensors are each coupled to the at least one connection and the at least one additional connection, respectively, and/or are formed at the at least one connection and the at least one additional connection, respectively, to detect as a gas property at least one gas pressure and/or one gas density and/or are arranged directly at the respective associated connection and/or are each formed with their associated connection in a connection hose.

8. The service system according to claim 6,
   wherein each one of the at least one connection and the at least one additional connection comprises a separate gas inlet and a separate gas outlet, and the conveying device and the gas treatment device are designed for continuous execution of a gas treatment process in which gas is continuously withdrawn from a gas compartment through the gas inlet, the gas is treated and the treated gas is discharged back into the gas compartment through the gas outlet, wherein the service system is designed to use the control unit to determine a treatment time of the gas during the continuous execution of the gas treatment process as a function of a continuously determined value of a gas property and to set it dynamically as a function of this value, and/or
   wherein the service system with the control unit is designed to cyclically extract gas from a gas compartment through a connection in a gas treatment process, to treat the gas and then to return the treated gas through the same connection into the gas compartment, the control unit being designed to determine a number of cycles of treatment of the gas during the cyclic execution of the gas treatment process as a function of a continuously determined value of a gas property and to adjust it dynamically as a function of this value, and/or
   wherein the service system with the control unit is designed to continuously determine at least one gas property of the gas from the gas compartment with the sensor device during a gas treatment process and to provide the determined data in a time series representation in a graphically visualized manner via a user interface, the control unit being designed to extrapolate the determined data and to graphically visualize the extrapolated data as a predicted course attached to the time series representation via the user interface.

9. The service system according to claim 6, wherein the control unit is designed to perform the gas treatment process cyclically alternating in a fixed sequence for the at least one gas compartment and the at least one additional gas compartment, and/or wherein the service system is designed to use the control unit to determine and control a sequence and/or frequency of the gas treatment process as a function of actual values of at least one gas property for each one of the at least one gas compartment and the at least one additional gas compartment or as a function of the respective gas volume of the at least one gas compartment and the at least one additional gas compartment or as a function of a respective leakage rate of the at least one gas compartment and the at least one additional gas compartment, the leakage rate being determined beforehand by logging an operating pressure of the gas compartment over a test period, or as a function of a pre-selected preference, and/or the service system is designed to carry out the gas treatment process with the control unit until a predetermined setpoint value of at least one gas property is reached and, after the setpoint value is reached, to carry out the gas treatment process for a further gas compartment, the gas property comprising a gas humidity, a concentration of decomposition products and/or a gas purity, and/or the service system is designed to use the control unit to prematurely interrupt the gas treatment process in one gas compartment if a limit value is exceeded in another gas compartment and to initiate emergency gas treatment in the other gas compartment.

10. The service system according to claim 6, wherein the service system is designed to use the control unit to set the waiting time as a function of a volume of the gas compartment, the waiting time increasing as the volume increases, or to use the control unit to set the waiting time as a function of a filling level of at least one filter of the gas treatment device, or to use the control unit to set the waiting time as a function of a leakage rate of the gas compartment, the leakage rate being determined beforehand by logging an operating pressure of the gas compartment over a test period, or to use the control unit to set the waiting time as a function of a gas property of a gas located within the gas compartment.

11. The service system according to claim 1, wherein the service system is designed to increase a gas pressure within the at least one gas compartment to a value above a standard operating pressure before the gas treatment process is carried out, wherein the service system is designed to determine and control with the control unit, a volume of treated gas returned to the at least one gas compartment during the execution of the gas treatment process such that a gas pressure in the at least one gas compartment corresponds to the standard operating pressure after the gas volume has been completely returned, and wherein the service system is designed to determine and set with the control unit, a gas volume removed from the at least one gas compartment during the execution of the gas treatment process such that a gas pressure within the at least one gas compartment after the removal of the gas volume is above a predetermined minimum setpoint value.

12. The service system according to claim 1, further comprising:

an internal sensor device for monitoring at least one gas property of the gas in the gas treatment device;

a recycling unit for exchanging gas from the gas treatment device; and a conveying device for conveying gas from the gas treatment unit to the recycling unit and vice versa, wherein a limit value is stored or adapted to be stored in the control unit for at least one gas property of the gas in the gas treatment device, wherein the service system is designed to detect with the control unit an exceeding of the limit value of the gas property of the gas in the gas treatment device during a gas treatment process by the internal sensor device, and if a limit value exceeding is detected:

to evacuate the gas treatment device after the end of the gas treatment process with the conveying device, to reprocess the gas from the gas treatment device in the recycling unit or store it in a storage tank, and to refill the gas treatment device with reprocessed gas from the recycling unit or with clean gas from a clean gas storage tank before the next gas treatment process is started, and wherein the internal sensor device is designed to monitor a concentration of decomposition products in the gas in the gas treatment device and the limit value is a maximum permissible concentration of decomposition products.

13. The service system according to claim 1, wherein for each gas property and each of the at least one gas compartment a nominal value and/or a permissible deviation from a nominal value is stored or adapted to be stored in the control unit and/or wherein the control unit is coupled or adapted to be coupled to a storage device, and wherein the control unit is designed to read out the respective setpoint value and/or the permissible deviation from a setpoint value from the storage device and to assign it to an associated gas compartment.

14. The service system according to claim 13, wherein the control unit is designed to initially detect the respective gas property at the at least one gas compartment via the sensor device in order to determine the setpoint and to store it as a setpoint, and/or is coupled to or comprises an input device, and wherein the input device is designed for manual input of the respective setpoint value and/or as a wirelessly connected mobile terminal.

15. The service system according to claim 1, wherein the gas treatment device comprises a drying unit which is designed to dry the gas by cooling and condensing a water vapor.

16. The service system according to claim 1, wherein the conveying device is designed to convey as gas sulfur hexafluoride, nitrogen, carbon dioxide, air, a fluoronitrile, a fluoroketone and/or a mixture of at least two of the aforementioned gases, and wherein the gas treatment device is designed to treat as gas sulfur hexafluoride, nitrogen, carbon dioxide, air, a fluoronitrile, a fluoroketone and/or a mixture of at least two of the aforementioned gases.

* * * * *